United States Patent
Steenwinkel et al.

(10) Patent No.: US 7,919,146 B2
(45) Date of Patent: Apr. 5, 2011

(54) AQUEOUS POLYURETHANE COMPOSITIONS

(75) Inventors: Pablo Steenwinkel, Waalwijk (NL); Andreas Jacobus Josine Goos, Waalwijk (NL); Paulus Johannes Maria Hönen, Waalwijk (NL); Gerardus Cornelis Overbeek, Waalwijk (NL)

(73) Assignee: DSM IP Assets B.V., Heerlen (NL)

( * ) Notice: Subject to any disclaimer, the term of this patent is extended or adjusted under 35 U.S.C. 154(b) by 619 days.

(21) Appl. No.: 11/886,151

(22) PCT Filed: Mar. 13, 2006

(86) PCT No.: PCT/EP2006/002454
§ 371 (c)(1), (2), (4) Date: Feb. 11, 2008

(87) PCT Pub. No.: WO2006/097318
PCT Pub. Date: Sep. 21, 2006

(65) Prior Publication Data
US 2008/0166485 A1 Jul. 10, 2008

(30) Foreign Application Priority Data

Mar. 17, 2005 (GB) .................................. 0505587.6
Apr. 26, 2005 (GB) .................................. 0508343.1

(51) Int. Cl.
*B05D 3/02* (2006.01)

(52) U.S. Cl. .................................................... 427/385.5
(58) Field of Classification Search ......................... None
See application file for complete search history.

(56) References Cited

U.S. PATENT DOCUMENTS

| 6,362,273 B1 * | 3/2002 | Martin et al. ................. 524/591 |
| 2002/0028875 A1 | 3/2002 | Anderle |
| 2005/0182188 A1 * | 8/2005 | Rische et al. ................. 524/589 |
| 2006/0111538 A1 * | 5/2006 | Coogan et al. ................. 528/44 |

FOREIGN PATENT DOCUMENTS

| EP | 0 646 609 A1 | 4/1995 |
| JP | 7-268055 | 10/1995 |

OTHER PUBLICATIONS

International Search Report mailed Jun. 7, 2006 in PCT/EP2006/002454.
Written Opinion mailed Jun. 7, 2006 in PCT/EP2006/002454.

* cited by examiner

*Primary Examiner* — Erma Cameron
(74) *Attorney, Agent, or Firm* — Nixon & Vanderhye P.C.

(57) ABSTRACT

An aqueous polyurethane composition comprising a polyurethane which is the reaction product of: (A) an isocyanate-terminated prepolymer and (B) at least one active-hydrogen chain-extending compound comprising at least 0.20 stoichiometric equivalents with respect to the isocyanate content of the isocyanate-terminated prepolymer (A), of an active-hydrogen chain-extending compound selected from the group consisting of hydrazine, hydrazine derivatives and mixtures thereof; and wherein at least 0.2 stoichiometric equivalents of the anionic or potentially anionic water-dispersing groups are neutralised with ammonia.

26 Claims, No Drawings

AQUEOUS POLYURETHANE COMPOSITIONS

This application is the US national phase of international application PCT/EP2006/002454 filed 13 Mar. 2006 which designated the U.S. and claims benefit of GB 0505587.6 and GB 0508343.1, dated 17 Mar. 2005 and 26 Apr. 2005, respectively, the entire content of each of which is hereby incorporated by reference.

The present invention relates to an aqueous polyurethane composition, a process for preparing such a composition and the use of such a composition for coating substrates.

Polyurethane compositions have long been used to produce coatings having desired coating characteristics. For example such coatings include primer coatings for plastic substrates, in particular substrates used in the film packaging industry (including food packaging) and primer coatings for film, label and graphic arts applications. Such primer coatings are often used in conjunction with top-coats, which may be heat-sealable. Top-coats include anionic and cationic polyvinylidene chloride (PVDC), acrylics, polyurethanes and hybrids thereof.

U.S. Pat. No. 5,656,701 describes polyurethane resin compositions which are prepared by chain-extension of a polyurethane prepolymer using a mixture of a chain-extender and a chain-terminator. These polyurethanes are characterized by having at least one group selected from hydrazine groups, hydrazide groups and semicarbazide groups in the molecule. The polyurethane resin may be produced using a chain-extender and/or a terminator that have at least one hydrazine group or hydrazide group. The use of chain-terminators may result in the formation of low molecular weight material, which may be detrimental to any adhesive properties of the polyurethane.

EP 646609 describes terminal hydrazide-functional polyurethane dispersions obtained by for example over-extension with chain-extenders or mixtures thereof containing hydrazine, or hydrazides such as adipic acid dihydrazide (ADH).

EP 350157 describes the use of aqueous over-extended polyurethane resins, in combination with acrylic polymer dispersions containing amido or ketone groups. The polyurethanes therein are described as being —NHNH$_2$ functional through the extension with more than one stoichiometric equivalent of a hydrazine derivative.

A disadvantage of using more than one equivalent of one or more chain-extension agents containing hydrazine is that free hydrazine is often detectable in the product dispersions and free hydrazine is usually considered to have a toxic nature and is therefore undesirable.

Surprisingly the aqueous polyurethane composition of the present invention which uses ammonia as at least part of the neutralisation agent and which uses hydrazine or a hydrazine derivative as a chain-extension agent provides good adhesion to plastic substrates when used as a primer and results in a high initial seal strength and humid seal strength when top-coated with a heat-sealable layer, without the presence of free hydrazine since an equal or less than one stoichiometric equivalent of the chain-extension agent is used.

According to the present invention there is provided an aqueous polyurethane composition comprising a polyurethane having an acid value of in the range of from 4 to 150 mgKOH/g and which comprises the reaction product of:
  (A) an isocyanate-terminated prepolymer obtained by the reaction of components comprising:
    (i) at least one organic polyisocyanate;
    (ii) at least one isocyanate-reactive compound bearing anionic or potentially anionic water-dispersing groups;
    (iii) at least one isocyanate-reactive compound not comprised by (ii);
    wherein the isocyanate-terminated prepolymer components are reacted in a ratio of isocyanate to isocyanate-reactive groups in the range of from 1.1:1 to 6:1; and
  (B) at least one active-hydrogen chain-extending compound comprising at least 0.20 stoichiometric equivalents with respect to the isocyanate content of the isocyanate-terminated prepolymer (A), of an active-hydrogen chain-extending compound selected from the group consisting of hydrazine, hydrazine derivatives and mixtures thereof;
wherein (A) and (B) are reacted in a ratio of isocyanate to isocyanate-reactive groups in the range of from 1:0.5 to 1:1; and
wherein at least 0.2 stoichiometric equivalents of the anionic or potentially anionic water-dispersing groups are neutralised with ammonia.

The term polyurethane as used herein includes one polyurethane as well as more than one polyurethane.

The term isocyanate-terminated prepolymer as used herein includes one isocyanate-terminated prepolymer as well as more than one isocyanate-terminated prepolymer.

Methods for preparing polyurethanes are known in the art and are described in for example the Polyurethane Handbook 2$^{nd}$ Edition, a Carl Hanser publication, 1994, by G. Oertel or Szycher's Handbook of Polyurethanes, CRC Press, 1999, by Michael Szycher, and these methods are included herein by reference. The polyurethane may be prepared in a conventional manner by reacting at least one organic polyisocyanate with at least one isocyanate-reactive compound by methods well known in the prior art. Isocyanate-reactive groups include —CHR$^1$—COOH where R$^1$ can be H, alkyl (more preferably C$_1$ to C$_8$ alkyl); —OH, —SH, —NH—, and —NH$_2$, where —OH, —NH—, and —NH$_2$ are preferred.

Component (i) comprises any suitable organic polyisocyanate including aliphatic, cycloaliphatic, araliphatic and/or aromatic polyisocyanates. Examples of suitable polyisocyanates include ethylene diisocyanate, 1,6-hexamethylene diisocyanate (HDI) and oligomers thereof, isophorone diisocyanate (IPDI), cyclohexane-1,4-diisocyanate, 4,4'-dicyclohexylmethane diisocyanate (4,4'-H12 MDI), p-xylylene diisocyanate, p-tetramethylxylene diisocyanate (p-TMXDI) (and its meta isomer m-TMXDI), 1,4-phenylene diisocyanate, hydrogenated 2,4-toluene diisocyanate, hydrogenated 2,6-toluene diisocyanate, 4,4'-diphenylmethane diisocyanate (4,4'-MDI), polymethylene polyphenylene polyisocyanates, 2,4'-diphenylmethane diisocyanate, 3(4)-isocyanatomethyl-1-methyl cyclohexyl isocyanate (IMCI) and 1,5-naphthylene diisocyanate. Mixtures of polyisocyanates can be used and also polyisocyanates which have been modified by the introduction of urethane, allophanate, urea, biuret, carbodiimide, uretonimine, urethdione or isocyanurate residues. Preferably the polyisocyanate is an araliphatic diisocyanate. More preferably the polyisocyanate is selected from isophorone diisocyanate, 4,4'-dicyclohexylmethane diisocyanate, 2,4-toluene diisocyanate and mixtures thereof. Most preferably the polyisocyanate is isophorone diisocyanate.

Preferably the isocyanate-terminated prepolymer comprises 10 to 90 wt %, more preferably 15 to 60 wt % and most preferably 20 to 40 wt % of component (i) (i.e. by weight of (i)+(ii)+(iii)).

Component (ii) comprises any suitable polyol, preferably a diol, containing anionic or potentially anionic water-dispersing groups.

Preferred anionic water-dispersing groups are carboxylic, phosphoric and/or sulphonic acid groups. Preferred examples of such compounds include carboxyl containing diols and triols, for example dihydroxy alkanoic acids such as 2,2-dimethylol propionic acid (DMPA) or 2,2-dimethylolbutanoic acid (DMBA), especially DMPA. Other useful compounds include amino carboxylic acids, for example lysine, cysteine and 3,5-diaminobenzoic acid and sulphonic acid derivatives, for example 4,6-diaminobenzene-1,3-disulphonic acid, 5-sodiosulpho-isophthalic acid (SSIPA) and taurine.

Examples of higher molecular weight compounds containing anionic water-dispersing groups include polyether, polyester and polycarbonate polyols containing carboxylic acid groups such as the fumarate polyether glycols described in U.S. Pat. No. 4,460,738, or for example caprolactone modified dihydroxy alkanoic acids.

The anionic or potentially anionic water-dispersing groups may alternatively be introduced by the reaction of an OH-functional polyol or polyurethane with a cyclic anhydride, before, during or after incorporation of this moiety into the final polyurethane.

Preferred compounds containing anionic or potentially anionic water-dispersing groups are DMBA, DMPA and mixtures thereof.

In the polyurethane dispersion, the anionic water-dispersing groups are preferably fully or partially in the form of a salt. Conversion to the salt form is optionally effected by neutralisation of the polyurethane with a base, preferably during the preparation of the polyurethane and/or during the preparation of the aqueous coating composition of the present invention.

When the anionic or potentially anionic water-dispersing groups are neutralised, preferably at least 0.25, more preferably between 0.25 and 3, even more preferably between 0.5 and 2 and most preferably between 0.7 and 2 stoichiometric equivalents of the anionic or potentially anionic water-dispersing groups are neutralised with ammonia.

Optionally more than 3 stoichiometric equivalents of ammonia could be added in one or more separate additions for example during the preparation and as well as after the preparation of the polyurethane to provide for better dispersion stability (but only if the excess is added after dispersion). Any remaining anionic or potentially anionic water-dispersing groups may be neutralised with an amine or an inorganic base. Again up to 2 SA of an additional amine may be used. Suitable amines include tertiary amines, such as for example triethylamine, dimethyl butyl amine or N,N-dimethyl ethanolamine. Triethylamine however, is known to have less favourable toxicological properties. Suitable inorganic bases include alkali hydroxides and carbonates, for example lithium hydroxide, sodium hydroxide, or potassium hydroxide. A quaternary ammonium hydroxide, for example $N^+(CH_3)_4(OH)$, can also be used. Generally a base is used which gives counter ions that may be desired for the composition. For example, preferred counter ions include $Li^+$, $Na^+$, $K^+$, $NH_4^+$ and substituted ammonium salts.

Preferably the isocyanate-terminated prepolymer comprises 0.1 to 80 wt %, more preferably 0.1 to 40 wt %, most preferably 1 to 15 wt %, especially 2 to 10 wt % and most especially 2 to 8 wt % of component (ii).

Preferably the weight average molecular weight (Mw) of component (ii) is in the range of from 100 to 10,000 g/mol, more preferably in the range of from 100 to 5,000 g/mol, most preferably in the range of from 120 to 1,000 g/mol and especially in the range of from 125 to 155 g/mol.

Component (iii) may contain cationic water-dispersing groups and/or may also contain non-ionic water-dispersing groups. Examples of cationic water-dispersing groups include pyridine groups, imidazole groups and/or tertiary amine groups which may be neutralised with an acid or permanently ionised (for example with dimethylsulphate).

Preferred non-ionic water-dispersing groups are polyalkylene oxide groups, more preferably polyethylene oxide groups. A small segment of the polyethylene oxide group can be replaced by propylene segments and/or butylene oxide segments, however the polyethylene oxide group should still contain ethylene oxide as a major component. When the water-dispersible group is polyethylene oxide, preferably the polyethylene oxide group has a molecular weight from 175 to 5000 g/mol, more preferably from 350 to 2200 g/mol and most preferably from 660 to 2200 g/mol.

Examples of such compounds containing non-ionic water-dispersing groups include methoxy polyethylene glycol (MPEG) with molecular weights of for example 550 g/mol, 750 g/mol, 1000 g/mol and 2000 g/mol.

The resultant polyurethane preferably contains a sufficient concentration of ionic and/or non-ionic water-dispersing groups via components (ii) and (iii) capable of rendering the polyurethane self-water-dispersible (i.e. dispersible in water without the requirement to use added dispersing agents) but the concentration of such groups is preferably not so great that the polyurethane has an unacceptably high water solubility in order to not compromise the water sensitivity of the final coating.

Moreover, the strength of the ionic and/or non-ionic water-dispersing groups or their efficiency as a dispersing and/or stabilising group may also influence the optimal amounts required.

Component (iii) may also contain crosslinkable groups. The crosslinkable groups may provide a self-crosslinkable polyurethane which may crosslink at ambient temperature by a number of mechanisms including, but not limited to, Schiff base crosslinking and silane condensation.

By Schiff base crosslinking is meant that crosslinking takes place by the reaction of a carbonyl functional group, where by a carbonyl functional group herein is meant an aldehyde or ketone group and includes an enolic carbonyl group such as is found in an acetoacetyl group, with a carbonyl-reactive amine and/or hydrazine (or blocked amine and/or blocked hydrazine) functional group.

By silane condensation is meant the reaction of alkoxy silane or —SiOH groups in the presence of water, to give siloxane bonds by the elimination of water and/or alkanols (for example methanol) during the drying of the aqueous coating composition.

Other crosslinking mechanisms known in the art include those provided by the reaction of epoxy groups with amino, carboxylic acid or mercapto groups, the reaction of mercapto groups with ethylenically unsaturated groups such as fumarate and acryloyl groups, the reaction of masked epoxy groups with amino or mercapto groups, the reaction of isothiocyanates with amines, alcohols or hydrazines, the reaction of amines (for example ethylene diamine or multifunctional amine terminated polyalkylene oxides) with β-diketo (for example acetoacetoxy or acetoacetamide) groups to form enamines. The use of blocked crosslinking groups, such as blocked isocyanate groups, may be beneficial. In those cases where crosslinking is desirable, the most preferred way of crosslinking is Schiff base or alkoxysilane crosslinking.

Component (iii) may also comprise polyols containing neither ionic or non-ionic water-dispersing groups, nor crosslinker groups.

Polyols having molecular weights in the range of from 500 to 6000 g/mol particularly include diols and triols and mixtures thereof but higher functionality polyols may be used, for example as minor components in admixture with diols. The polyols may be members of any of the chemical classes of polyols used or proposed to be used in polyurethane formulations. In particular the polyols may be polyesters, polyesteramides, polyethers, polythioethers, polycarbonates, polyacetals, polyolefins or polysiloxanes. Preferred weight average molecular weights (Mw) are from 600 to 4000 g/mol and more preferably from 700 to 3000 g/mol.

Polyester polyols which may be used include hydroxyl-terminated reaction products of polyhydric alcohols such as ethylene glycol, propylene glycol, diethylene glycol, neopentyl glycol, 1,4-butanediol, furan dimethanol, cyclohexane dimethanol, glycerol, trimethylolpropane or pentaerythritol, or mixtures thereof, with polycarboxylic acids, especially dicarboxylic acids or their ester-forming derivatives, for example phthalic, succinic, glutaric, adipic, malonic, maleic, and dimer fatty acids, anhydrides or their short alkyl esters such as for example dimethylterephthalate. Polyesters obtained by the polymerisation of lactones, for example caprolactone, in conjunction with a polyol may also be used. Polyesteramides may be obtained by the inclusion of aminoalcohols, such as ethanolamine, or polyamines in polyesterification mixtures.

Polyether polyols which may be used include products obtained by the polymerisation of a cyclic oxide, for example ethylene oxide, propylene oxide or tetrahydrofuran or by the addition of one or more such oxides to polyfunctional initiators, for example water, ethylene glycol, propylene glycol, diethylene glycol, cyclohexane dimethanol, glycerol, trimethylolpropane, pentaerythritol or Bisphenol A. Especially useful polyesters include polyoxypropylene diols and triols, poly (oxyethylene-oxypropylene) diols and triols obtained by the simultaneous or sequential addition of ethylene and propylene oxides to appropriate initiators and polytetramethylene ether glycols obtained by the polymerisation of tetrahydrofuran.

Polythioether polyols which may be used include products obtained by condensing thiodiglycol either alone or with other glycols, dicarboxylic acids, formaldehyde, aninoalcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerising cyclic acetals.

Suitable polyolefin polyols include hydroxy-terminated butadiene or terpene homo and copolymers.

Preferably the polyol is a polyether polyol, more preferably polytetrahydrofuran (also known as polytetramethylene glycol, polybutylene oxide or polyTHF).

Most preferably component (iii) is selected from polyTHF, polypropylene glycol, polyester, amine group terminated polyalkylene oxides (for example Jeffamines available from Huntsman) or derivatives thereof (such as are described in EP 317258 B1 and or mixtures thereof. Preferably the Mw of this selection is in the range of from 300 to 3000 g/mol.

For component (iii) low molecular weight organic compounds containing at least one (preferably at least two) isocyanate-reactive groups and having a weight average molecular weight below 500 g/mol, preferably in the range of 40 to 250 g/mol, can also be used. Examples include ethyleneglycol, diethylene glycol, triethylene glycol, tetraethylene glycol and similarly polyglycols made from propylene glycol and 1,3- or 1,4-butane diol up to a molecular weight of 499 g/mol, neopentyl glycol; 1-propanol, bis(hydroxyethyl) terephthalate, furan dimethanol, glycerol, 1,4-cyclohexyldimethanol and the reaction products of these examples with propylene and/or ethylene glycol up to a molecular weight of 499 g/mol. Preferably component (iii) comprises <15 wt % and more preferably <10 wt % of these low molecular weight organic compounds.

Preferably the isocyanate-terminated prepolymer comprises 5 to 90 wt %, more preferably 10 to 80 wt %, most preferably 20 to 75 wt %, especially 45 to 70 wt % and most especially 50 to 70 wt % of component (iii).

The resultant polyurethane in the composition preferably has a particle size in the range of from 20 to 5000 nm, more preferably in the range of from 25 to 1000 nm and most preferably in the range of 30 to 250 nm.

The polyurethane preferably has an acid value in the range of from of 4 to 100 mgKOH/g, more preferably 8 to 65 mgKOH/g, most preferably 10 to 42 mgKOH/g and especially 15 to 30 mgKOH/g.

The polyurethane preferably has a number average molecular weight (Mn) in the range of from 2,000 to 1,000,000 g/mol, more preferably in the range of from 3,000 to 200,000 g/mol, even more preferably in the range of from 4,000 to 100,000 g/mol, most preferably in the range of from 8,000 to 40,000 g/mol and especially in the range from 10,000 to 20,000 g/mol. The molecular weight may be measured by Gel Permeation Chromatography (GPC) with respect to polystyrene standards and using a suitable eluent such as for example tetrahydrofuran or N,N-dimethyl acetamide.

The isocyanate-terminated prepolymer is conventionally formed by reacting a stoichiometric excess of the organic polyisocyanate with the isocyanate-reactive compounds under substantially anhydrous conditions at a temperature between about 30° C. and about 130° C. until reaction between the isocyanate groups and the isocyanate-reactive groups is substantially complete; the components for the isocyanate-terminated prepolymer are preferably used in proportions corresponding to a ratio of isocyanate groups to isocyanate-reactive groups of from 1.1:1 to 4:1, more preferably from 1.3:1 to 3:1 and especially from 1.4:1 to 2:1.

If desired, catalysts such as dibutyltin dilaurate and stannous octoate, zirconium or titanium based or tertiary amine based catalysts may be used to assist the isocyanate-terminated prepolymer and/or polyurethane formation.

An organic solvent may optionally be added before, during or after isocyanate-terminated prepolymer formation or final polyurethane formation to control the viscosity. Examples of solvents include water-miscible solvents such as N-methylpyrrolidinone, N-ethylpyrrolidinone, dimethyl acetamide, glycols and glycol ethers such as butyldiglycol, acetone, methyl ethyl ketone and alkyl ethers of glycol acetates or mixtures thereof. If solvents are used, then preferably the use of solvent is minimised. Preferably less than 5 wt % and more preferably less than 1 wt % of organic solvent based on the weight of the aqueous composition of the invention is used. Most preferably no organic solvents are added during the preparation of the aqueous composition of the invention.

The aqueous polyurethane composition may be prepared by dispersing the isocyanate-terminated prepolymer (A) (optionally carried in an organic solvent medium) in an aqueous medium and chain-extending the isocyanate-terminated prepolymer (A) with at least one active hydrogen-containing chain-extender (B) in the aqueous phase.

Preferably the active-hydrogen containing chain-extender (B) comprises at least 0.4, more preferably at least 0.5 and especially 0.8 stoichiometric equivalents with respect to the isocyanate content of the isocyanate-terminated prepolymer (A), of an active-hydrogen chain-extending compound selected from the group consisting of hydrazine, hydrazine derivatives and mixtures thereof.

Examples of suitable hydrazine derivatives include azines such as acetone azine, substituted hydrazines such as dimethyl hydrazine, 1,6-hexamethylene-bis-hydrazine, carbodihydrazine, hydrazides of polycarboxylic acids and sulphonic acids such as adipic acid mono- or dihydrazide, succinic acid dihydrazide, oxalic acid dihydrazide, isophthalic acid dihydrazide, tartaric acid dihydrazide, 1,3-phenylene disulphonic acid dihydrazide, omega-amino-caproic acid dihydrazide, citric acid trihydrazide, 1,2,4-butane tricarboxylic acid trihydrazide, hydrazides made by reacting lactones with hydrazide such as gamma-hydroxylbutyric hydrazide, bis-semicarbazide and bis-hydrazide carbonic esters of glycols, and semicarbazides derived from the reaction of polyisocyanates with an excess of hydrazine (optionally followed by reaction with ketones such as acetone to form the corresponding semicarbazones).

More preferred hydrazine derivatives include hydrazine derivatives selected from the group consisting of acetone azine, dimethyl hydrazine, 1,6-hexamethylene-bis-hydrazine, carbodihydrazine, adipic acid monohydrazide, adipic acid dihydrazide, succinic acid dihydrazide, oxalic acid dihydrazide, isophthalic acid dihydrazide, tartaric acid dihydrazide, 1,3-phenylene disulphonic acid dihydrazide, citric acid trihydrazide, 1,2,4-butane tricarboxylic acid trihydrazide, gamma-hydroxylbutyric hydrazide and mixtures thereof.

Any remaining isocyanate groups in the isocyanate-terminated prepolymer (B) may be chain-extended with active hydrogen-containing chain-extenders in conjunction with the hydrazine and/or hydrazine derivative, which include, aminoalcohols, a primary or secondary aliphatic, alicyclic, aromatic, aralipahtic or heterocyclic and especially a diamine. Water-soluble chain-extenders are preferred. Examples of suitable chain-extenders useful herein include ethylene diamine, diethylene triamine, triethylene tetramine, propylene diamine, butylene diamine, hexamethylene diamine, cyclohexylene diamine, piperazine, 2-methyl piperazine, phenylene diamines, tolylene diamines, xylylene diamines, tris(2-aminoethyl) amine, 3,3'-dinitrobenzidine, 4,4'-methylenebis(2-chloraniline), 3,3'-dichloro-4,4'-biphenyl diamine, 2,6-diaminopyridine, 4,4'-diaminodiphenylmethane, methane diamine, xylene diamines, isophorone diamine, and adducts of diethylene triamine with acrylate or its hydrolysed products.

Where the chain-extender is, for example, a polyamine and/or hydrazine derivative, it may be added to the aqueous dispersion of the isocyanate-terminated prepolymer or, alternatively, it may already be present in the aqueous medium when the isocyanate-terminated prepolymer is dispersed therein. The isocyanate-terminated prepolymer may also be chain-extended to form the polyurethane while dissolved in organic solvent (usually acetone) followed by the addition of water to the solution until water becomes the continuous phase and the subsequent removal of the solvent by distillation to form an aqueous dispersion.

The chain-extension may be conducted at elevated, reduced or ambient temperatures. Convenient temperatures are from about 5° C. to 95° C. or, more preferably, from about 10° C. to 50° C.

The total amount of active-hydrogen chain-extending compound employed should be such that the ratio of isocyanate groups in the isocyanate-terminated prepolymer (A) to active-hydrogens in the chain-extender (B) is approximately at, but preferably just above 1:1, and the ratio is preferably in the range of from 1:0.6 to 1:1, more preferably 1:0.7 to 1:1, most preferably 1:0.8 to 1:0.99 and especially 1:0.8 to 1:0.97.

In an embodiment of the present invention there is provided an aqueous polyurethane composition comprising a polyurethane having an acid value in the range of from 10 to 42 mgKOH/g and which comprises the reaction product of:
 (A) an isocyanate-terminated prepolymer obtained by the reaction of components comprising:
  (i) 10 to 90 wt %, more preferably 20 to 40 wt % at least one organic polyisocyanate;
  (ii) 0.1 to 80 wt %, more preferably 2 to 8 wt % of at least one isocyanate-reactive compound bearing anionic or potentially anionic water-dispersing groups;
  (iii) 5 to 90 wt %, more preferably 50 to 70 wt % of at least one isocyanate-reactive compound not comprised by (ii);
 where (i)+(ii)+(iii)=100%;
 wherein the isocyanate terminated prepolymer components are reacted in a ratio of isocyanate to isocyanate-reactive groups in the range of from 1.1:1 to 6:1; and
 (B) at least one active-hydrogen chain-extending compound comprising at least 0.40 stoichiometric equivalents with respect to the isocyanate content of the isocyanate-terminated prepolymer (A), of an active-hydrogen chain-extending compound selected from the group consisting of hydrazine, hydrazine derivatives and mixtures thereof;
wherein (A) and (B) are reacted in a ratio of isocyanate to isocyanate-reactive groups in the range of from 1:0.8 to 1:0.99; and
wherein in the range of from 0.25 and 3 stoichiometric equivalents of the anionic or potentially anionic water-dispersing groups are neutralised with ammonia.

In a further embodiment of the present invention there is provided an aqueous polyurethane composition comprising a polyurethane having an acid value in the range of from 10 to 42 mgKOH/g and which comprises the reaction product of:
 (A) an isocyanate-terminated prepolymer obtained by the reaction of components comprising:
  (i) 20 to 40 wt % of at least one organic polyisocyanate selected from the group consisting of isophorone diisocyanate, 4,4'-dicyclohexylmethane diisocyanate, 2,4-toluene diisocyanate and mixtures thereof;
  (ii) 2 to 8 wt % of at least one isocyanate-reactive compound bearing anionic or potentially anionic water-dispersing groups selected from the group consisting of 2,2-dimethylol propionic acid (DMPA), 2,2-dimethylolbutanoic acid (DMBA) and mixtures thereof;
  (iii) 50 to 70 wt % of at least one isocyanate-reactive compound not comprised by (ii) with a Mw in the range of from 300 to 3000 g/mol, more preferably with a Mw in the range of from 600 to 2000 g/mol and most preferably with a Mw in the range of from 800 to 1200 g/mol selected from the group consisting of polyTHF; polypropylene glycol; polyester; amine group terminated polyalkylene oxides or derivatives; and mixtures thereof;

where (i)+(ii)+(iii)=100%;
    wherein the isocyanate terminated prepolymer components are reacted in a ratio of isocyanate to isocyanate-reactive groups in the range of from 1.1:1 to 6:1; and
(B) at least one active-hydrogen chain-extending compound comprising at least 0.40 stoichiometric equivalents with respect to the isocyanate content of the isocyanate-terminated prepolymer (A), of an active-hydrogen chain-extending compound selected from the group consisting of hydrazine, hydrazine derivatives and mixtures thereof;
wherein (A) and (B) are reacted in a ratio of isocyanate to isocyanate-reactive groups in the range of from 1:0.8 to 1:0.99; and
wherein in the range of from 0.25 and 3 stoichiometric equivalents of the anionic or potentially anionic water-dispersing groups are neutralised with ammonia.

The isocyanate-terminated prepolymer (or the polyurethane) may be dispersed in an aqueous medium such as water using techniques well known in the art. Preferably, the isocyanate-terminated prepolymer (or the polyurethane) is added to the water with agitation or, alternatively, water may be stirred into the isocyanate-terminated prepolymer (or the polyurethane).

Surfactants and/or high shear can be utilised in any order to assist in the dispersion of isocyanate-terminated prepolymer (or the polyurethane) in water (even if it is self-dispersible). Suitable surfactants include but are not limited to conventional anionic, cationic and/or nonionic surfactants such as Na, K and $NH_4$ salts of dialkylsulphosuccinates, Na, K and $NH_4$ salts of sulphated oils, Na, K and $NH_4$ salts of alkyl sulphonic acids, Na, K and $NH_4$, alkyl sulphates, alkali metal salts of sulphonic acids; fatty alcohols, ethoxylated fatty acids and/or fatty amines, and Na, K and $NH_4$ salts of fatty acids such as Na stearate and Na oleate. Other anionic surfactants include alkyl or (alk)aryl groups linked to sulphonic acid groups, sulphuric acid half ester groups (linked in turn to polyglycol ether groups), phosphonic acid groups, phosphoric acid analogues and phosphates or carboxylic acid groups. Cationic surfactants include alkyl or (alk)aryl groups linked to quaternary ammonium salt groups. Non-ionic surfactants include polyglycol ether compounds and polyethylene oxide compounds. The amount of surfactant used is preferably 0 to 15 wt %, more preferably 0 to 8 wt %, still more preferably 0 to 5 wt %, especially 0.1 to 3 wt % and most especially 0.3 to 2 wt % based on the weight of the polyurethane.

In an embodiment of the present invention there is provided a process for preparing the aqueous composition according to the invention comprising the following steps:
  a) reaction of components (i) to (iii) to form an isocyanate-terminated prepolymer (A);
  b) forming an aqueous dispersion of the isocyanate-terminated prepolymer (A);
  c) optionally neutralising the isocyanate-terminated prepolymer (A);
  d) chain-extension of the isocyanate-terminated prepolymer (A) by reaction with the active-hydrogen chain-extending compound (B).

Steps b), c) and d) can occur in any order, for example all three can occur simultaneously or step d) can occur after steps b) and c). Step c) can occur after and/or during step a) and/or before and/or during step b). Preferably steps b), c) and d) occur simultaneously.

The process may additionally comprise step e) the addition of a reactive diluent and step f) the subsequent polymerisation of the reactive diluent added in step e). Addition of a reactive diluent (step e)) may be carried out at any stage, for example before starting the prepolymer reaction, or at any stage during and/or after the prepolymer formation or it may be added to the aqueous phase before, during and/or after the dispersion step b).

Preferably step f) is carried out after step b). Preferably some or all of the ammonia is already present in an aqueous medium when the isocyanate-terminated prepolymer (or polyurethane) is dispersed in the aqueous medium.

The polyurethane dispersion of the invention may be combined with one or more of any other polymer known in the art, such as for example vinyl polymers (including (meth)acrylic polymers), alkyds, polyesters, polyethers, polycarbonates and amino resins.

In another embodiment of the present invention if a reactive diluent is employed, in particular where the reactive diluent comprises olefinically unsaturated monomers (also known as vinyl monomers) these may be polymerised in situ to prepare a vinyl polymer.

Examples of vinyl monomers which may be used as a reactive diluent and are subsequently polymerised to form an in situ vinyl polymer include but are not limited to vinyl monomers such as 1,3-butadiene, isoprene; trifluoro ethyl (meth)acrylate (TFEMA); dimethyl amino ethyl (meth)acrylate (DMAEMA); polyalkylene glycol di(meth)acrylates such as 1,3-butyleneglycol diacrylate, ethyleneglycol diacrylate; divinyl benzene; styrene, α-methyl styrene, (meth)acrylic amides and (meth)acrylonitrile; vinyl halides such as vinyl chloride; vinylidene halides such as vinylidene chloride; vinyl ethers; vinyl esters such as vinyl acetate, vinyl propionate, vinyl laurate; vinyl esters of versatic acid such as VeoVa 9 and VeoVa 10 (VeoVa is a trademark of Resolution); heterocyclic vinyl compounds; alkyl esters of mono-olefinically unsaturated dicarboxylic acids such as di-n-butyl maleate and di-n-butyl fumarate and in particular, esters of acrylic acid and methacrylic acid of formula $CH_2=CR^1-COOR^2$ wherein $R^1$ is H or methyl and $R^2$ is optionally substituted alkyl or cycloalkyl of 1 to 20 carbon atoms (more preferably 1 to 8 carbon atoms) examples of which are methyl (meth)acrylate, ethyl (meth)acrylate, butyl (meth)acrylate (all isomers), octyl (meth)acrylate (all isomers), 2-ethylhexyl (meth)acrylate, isopropyl (meth)acrylate and n-propyl (meth)acrylate. Preferred monomers of formula $CH_2=CR^1-COOR^2$ include butyl (meth)acrylate (all isomers), methyl (meth)acrylate, octyl (meth)acrylate (all isomers) and ethyl (meth)acrylate. Particularly preferred vinyl monomers include (meth)acrylate monomers and styrene based monomers. Most preferred monomers are methyl methacrylate, butyl (meth)acrylate, 2-ethylhexyl acrylate, styrene and acrylonitrile.

A vinyl polymer made from a monomer system comprising at least 40 wt % of one or more monomers of the formula $CH_2=CR^1-COOR^2$ as defined above is defined herein as an (meth)acrylate polymer. More preferably, the monomer system contains at least 50 wt % of such monomers, and particularly at least 60 wt %. The other monomers in such (meth)acrylate polymers (if used) may include one or more of the other vinyl monomers mentioned herein, and/or may include different vinyl monomers. Preferably the vinyl polymer is a (meth)acrylate polymer.

It is also preferred to use vinyl monomers that do not contain isocyanate or isocyanate-reactive groups. Thus, suitable vinyl monomers include ethylenically unsaturated hydrocarbons, esters and ethers, especially esters of (meth)acrylic acids; esters and ethers of vinyl alcohol and styrene. Specific examples include butadiene, isoprene, styrene, substituted styrenes, the lower alkyl (C1-6) esters of (meth)acrylic and maleic acids, vinyl acetate, butyrate, (meth)acrylate, acrylonitrile, allyl methacrylate, vinyl methyl, propyl and butyl ethers, divinyl ether, divinyl sulphide, vinyl chloride, vinylidene chloride, hexanediol diacrylate, trimethylolpropane triacrylate and the like.

The vinyl monomers may include vinyl monomers carrying functional groups such as crosslinker groups and/or water-dispersing groups. Such functionality may be introduced directly in the polymer by free-radical polymerisation, or alternatively the functional group may be introduced by a reaction of a reactive vinyl monomer, which is subsequently reacted with a reactive compound carrying the desired functional group. Some functional groups may perform more than one function, for example (meth)acrylic acid is usually used as a water-dispersing monomer however it may also act as a crosslinking monomer. Such variations are known to those skilled in the art.

Preferred vinyl monomers providing crosslinking groups for crosslinking methods such as autoxidation, Schiff base crosslinking and silane condensation include acrylic and methacrylic monomers having at least one free carboxyl, hydroxyl, epoxy, acetoacetoxy, allyl, fatty acid, or amino group, such as (meth)acrylic acid, glycidyl acrylate, glycidyl methacrylate, aceto acetoxy ethyl methacrylate, allyl methacrylate, tetraethylene glycol methacrylate, divinyl benzene, t-butylamino ethyl methacrylate and dimethylamino ethyl methacrylate. Amino functionality may be incorporated by any means known to those skilled in the art, for example by preparing a vinyl polymer comprising vinyl monomers such as acrylic acid or methacrylic acid and subsequently converting at least a proportion of the carboxylic acid groups to amino groups (as part of amino ester groups), for example by an imination reaction using an alkylene imine such as ethylene imine or propylene imine.

Such crosslinking functional groups may be used for imparting latent crosslinkability to the composition (so that crosslinking takes place for example after the aqueous composition is subsequently dried) either when combined with an externally added crosslinking agent and/or by reaction with each other and/or by reaction with the polyurethane polymer.

Vinyl monomers providing ionic or potentially ionic water-dispersing groups include but are not limited to (meth)acrylic acid, itaconic acid, maleic acid, β-carboxyethyl acrylate, monoalkyl maleates (for example monomethyl maleate and monoethyl maleate), citraconic acid, styrenesulphonic acid, vinylbenzylsulphonic acid, vinylsulphonic acid, acryloyloxyalkyl sulphonic acids (for example acryloyloxymethyl sulphonic acid), 2-acrylamido-2-alkylalkane sulphonic acids (for example, 2-acrylamido-2-methylethanesulphonic acid), 2-methacrylamido-2-alkylalkane sulphonic acids (for example 2-methacrylamido-2-methylethanesulphonic acid), mono(acryloyloxyalkyl) phosphates (for example mono (acryloyloxyethyl)phosphate) and mono(methacryloyl-oxyalkyl) phosphates (for example, mono(methacryloyloxyethyl)phosphate).

However, preferably vinyl monomers providing ionic or potentially ionic water-dispersing groups are not utilised for an in situ prepared vinyl polymer as these may destabilise the polyurethane dispersion.

Non-ionic water-dispersing groups may be in-chain, pendant or terminal groups. Preferred vinyl monomers providing non-ionic water-dispersing groups include alkoxy polyethylene glycol (meth)acrylates, preferably having a Mn in the range of from 350 to 3000 g/mol. Examples of such monomers which are commercially available include ω-methoxy-polyethylene glycol (meth)acrylate. Examples of vinyl monomers providing non-ionic water-dispersing groups with a Mn less than 350 g/mol include diethylene glycol mono vinyl ether.

Most preferably the vinyl monomers used to prepare the vinyl polymer are selected from the group consisting of methyl methacrylate, butyl (meth)acrylate, ethyl acrylate, styrene, (meth)acrylic acid and mixtures thereof.

Preferably the acid value of the vinyl polymer is in the range of from 0 to 100 mgKOH/g, more preferably 0 to 70 mgKOH/g and especially 0 to 50 mgKOH/g.

As is well known in the art, if a vinyl polymer is prepared in the presence of the polyurethane (in situ) then preferably the vinyl monomers used to prepare the vinyl polymer contain only a small amount, and preferably substantially no (meth) acrylic acid.

For an in situ prepared vinyl polymer the preferred vinyl monomers are liquid under the temperature conditions of the isocyanate-prepolymer formation although the possibility of using solid vinyl monomers optionally in conjunction with organic solvents is not excluded.

For an in situ prepared vinyl polymer all of the vinyl monomers may be present at the commencement of the preparation of the isocyanate-terminated prepolymer or some or all of the vinyl monomers may be added during the course of the preparation. Preferably the vinyl monomers are not polymerised until after chain-extension has been carried out.

The proportion of vinyl monomer used as a reactive diluent for the isocyanate-terminated prepolymer preparation is preferably from 0 to 95 wt %, more preferably from 0 to 80 wt %, most preferably from 5 to 50 wt % and especially from 10 to 40 wt % of the total weight of polyurethane and in situ prepared vinyl polymer together.

Preferably the acid value of an in situ prepared vinyl polymer is in the range of from 0 to 20 mgKOH/g, more preferably 0 to 10 mgKOH/g and especially substantially 0 mgKOH/g.

The polyurethane of the invention composition may also be combined with a separately prepared polymer, such as for example a separately prepared vinyl polymer. The vinyl monomers suitable for making a separately prepared vinyl polymer include all of the vinyl monomers suitable for making an in situ prepared vinyl polymer.

Preferably the acid value of a separately prepared vinyl polymer is in the range of from 0 to 100 mgKOH/g, more preferably 0 to 70 mgKOH/g, more preferably from 0 to 50 mgKOH/g and especially 0 to 40 mgKOH/g.

Preferably the weight average molecular weight (Mw) of the vinyl polymer (in situ or separately prepared) is in the range of from 1,000 to 10,000,000 g/mol, more preferably in the range of from 2,000 to 5,000,000 g/mol and most preferably in the range of from 5,000 to 3,000,000 g/mol.

Preferably the calculated (by the well known Fox equation) Tg of the vinyl polymer (in situ or separately prepared) is preferably in the range of from −80 to 150° C., more preferably −60 to 120° C., most preferably −40 to 106° C., especially −20 to 80° C., more especially 0 to 80° C. and most especially 10 to 80° C.

The vinyl polymer (in situ or separately prepared) may be a sequential vinyl polymer. If the vinyl polymer is a sequential vinyl polymer, then preferably there are at least two Tg values where the difference between the two Tg values is at least 40° C., more preferably at least 55° C. If the vinyl polymer is a sequential vinyl polymer, then preferably at least 40 wt % of the vinyl polymer has a Tg between −40 and 30° C. and more preferably between −20 and 15° C. If the vinyl polymer is a blend of different vinyl polymers, then preferably 30 to 90 wt % of the vinyl polymers have a Tg≦25° C. and 10 to 70 wt % of the vinyl polymers have a Tg≧45° C. and more preferably ≧55° C.

Preferably the total amount of polyurethane to vinyl polymer (in situ or separately prepared) solids weight ratio is in the range of from 10:90 to 99:1, more preferably 30:70 to 95:5, most preferably 40:60 to 90:10, especially 50:50 to 80:20 and most especially 60:40 to 80:20.

In an embodiment of the present invention the aqueous polyurethane composition of the present invention comprises an in situ prepared vinyl polymer in polyurethane to vinyl solids ratio in the range of from 60:40 to 80:20; wherein the vinyl polymer has a Tg in the range of from 10 to 80° C. and is prepared from vinyl monomers selected from the group comprising methyl methacrylate, ethyl (meth)acrylate, butyl (meth)acrylate, styrene and mixtures thereof.

In further embodiment of the present invention the aqueous polyurethane composition of the present invention comprises a separately prepared vinyl polymer in polyurethane to vinyl solids ratio in the range of from 60:40 to 80:20; wherein the vinyl polymer has a Tg in the range of from 0 to 50° C. and is prepared from vinyl monomers selected from the group comprising of methyl methacrylate, ethyl (meth)acrylate, butyl (meth)acrylate, styrene, (meth)acrylic acid and mixtures thereof.

The vinyl polymer (in situ or separately prepared) is preferably prepared by free-radical polymerisation, although in some circumstances anionic polymerisation may be utilised. The free-radical polymerisation can be performed by techniques well known in the art, for example, emulsion polymerisation, solution polymerisation, suspension polymerisation or bulk polymerisation. Preferably an emulsion polymerisation process is used for an in situ prepared vinyl polymer.

The bulk polymerisation of vinyl monomers is described in detail in EP 0,156,170, WO 82/02387 and U.S. Pat. No. 4,414,370. In general, in a bulk polymerisation process a mixture of two or more vinyl monomers are charged continuously into a reactor zone containing molten vinyl oligomer having the same ratio of vinyl monomers as the vinyl monomer mixture.

The free-radical polymerisation may be carried out as a batch, step-wise, gradient (also known as power feed) or as a semi-continuous polymerisation process to make a single or a multistage polymer.

Free-radical polymerisation of vinyl monomers will require the use of a free-radical-yielding initiator to initiate the vinyl polymerisation. Suitable free-radical-yielding initiators include K, Na or ammonium persulphate; hydrogen peroxide; percarbonates; organic peroxides, such as acyl peroxides including benzoyl peroxide, alkyl hydroperoxides such as t-butyl hydroperoxide and cumene hydroperoxide; dialkyl peroxides such as di-t-butyl peroxide; peroxy esters such as t-butyl perbenzoate and the like; mixtures may also be used. The peroxy compounds are in some cases advantageously used in combination with suitable reducing agents (redox systems) such as Na or K pyrosulphite or bisulphite, and iso-ascorbic acid. Metal compounds such as Fe.EDTA (EDTA is ethylene diamine tetracetic acid) may also be usefully employed as part of the redox initiator system, for example a combination of t-butyl hydroperoxide, isoascorbic acid and Fe.EDTA may partition between aqueous and organic phases. Azo functional initiators may also be used. Preferred azo initiators include azobis(isobutyronitrile) and 4,4'-azobis(4-cyanovaleric acid). The amount of initiator or initiator system used is conventional, e.g. within the range 0.05 to 6 wt % based on the total weight of vinyl monomers used. Preferred initiators include ammonium persulphates, sodium persulphates, potassium persulphates, azobis(isobutyronitrile) and/or 4,4'-azobis(4-cyanovaleric acid).

Molecular weight control may be provided by using chain-transfer agents such as mercaptans and halogenated hydrocarbons, for example mercaptans such as n-dodecyl mercaptan, n-octyl mercaptan, t-dodecyl mercaptan, mercaptoethanol, iso-octyl thioglycolate, $C_2$ to $C_8$ mercapto carboxylic acids and esters thereof such as 3-mercaptopropionic acid and 2-mercaptopropionic acid; and halogenated hydrocarbons such as carbon tetrabromide and bromotrichloromethane. Molecular weight control may also be provided by catalytic chain-transfer agents such as transition metal complexes, in particular a selected cobalt chelate complex as disclosed in U.S. Pat. No. 4,526,945, U.S. Pat. No. 4,680,354, EP 0,196,783, EP 0,199,436, EP 0,788,518 and WO 87/03605.

After polymerisation, the free vinyl monomer content in the aqueous polyurethane composition of the invention is preferably less than 500 ppm, more preferably less than 150 ppm and most preferably less than 70 ppm.

The aqueous polyurethane composition of the present invention preferably has a solids content of from about 1 to 60 wt % and more preferably from 2 to 55 wt %.

The aqueous polyurethane composition of the present invention preferably has a free hydrazine content ≦20 ppm, more preferably ≦10 ppm, most preferably ≦4 ppm and especially ≦2 ppm (undetectable free hydrazine).

The aqueous polyurethane composition of the present invention may contain other conventional ingredients including coalescing organic solvents, pigments, dyes, emulsifiers, surfactants, thickeners, heat stabilisers, levelling agents, anti-cratering agents, fillers, sedimentation inhibitors, rheology modifiers, UV absorbers, antioxidants, drier salts and the like introduced at any stage of the preparation process or subsequently. It is possible for example to include an amount of antimony oxide in the dispersions to enhance the fire retardant properties. To improve chemical resistances to for example water, detergents, and alcohols the aqueous composition of the present invention may contain an external crosslinker, such as CX-100, CX-300 (available from DSM NeoResins BV) or a water dispersible polyisocyanate added at any stage of the preparation, but preferably subsequently.

The aqueous polyurethane compositions produced by the method of the invention are storage stable dispersions, which do not need extra solvent or surfactant, although if desired, minor amounts of emulsifiers and/or solvents may be included.

The aqueous polyurethane composition of the present invention is useful as a coating composition or for providing the principle component of coating compositions (e.g. protective or decorative coating compositions) for which purpose they may be further diluted with water and/or organic solvents, or they may be supplied in more concentrated form by evaporation of water and/or organic components of the liquid medium.

The aqueous polyurethane composition of the present invention may be applied to a variety of substrates including wood, board, metal, stone, concrete, glass, cloth, leather, paper, plastic, foam and the like, by conventional methods including brushing, dipping, flow coating, spraying and the like. The aqueous medium usually comprising water and any co-solvent is removed by natural or accelerated (by heat) drying to form a coating.

In the food packaging film industry, dominated by oriented polypropylene (OPP), several structures (plain, co-extruded, voided, pigmented, coated, laminated) have been developed to make a suitable film.

Where conventional structures fail as a result of extreme requirements, specific coatings may be used to provide a solution. Coatings may be used to promote not only printability with printing inks, gloss and barrier performance (like oxygen, moisture and odour), but also enhance heat-sealability, metallisation and appearance of the packaging material. If a barrier is required, polyvinylidene chloride (PVDC) or ethylene vinyl alcohol copolymer (EVOH) coatings are the most suitable products, where PVDC has the additional advantage of being heat-sealable. Acrylic coatings are widely used for their excellent printability, heat-sealability and clarity.

It has been found that adhesion of the coating to the substrate is an important feature. In particular polypropylene (OPP) film for food packaging requires extremely good adhesion for optimum seal strength, when the film is sealed on a packaging line. To enable heat-sealability a coating may be applied. A seal is usually made at the lowest possible temperature, lowest possible pressure and shortest time, and preferably the seal should maintain its strength over long periods of time and at severe conditions. One such condition is the humid seal strength resistance. Here the seal made should maintain its strength over time when stored at tropical conditions i.e. high temperature and humidity. Preferably the heat seal strength of the coating is ≧200 g/inch (78.74 g/cm) and more preferably ≧400 g/inch (157.48 g/cm). The heat seal strength is the heat seal strength measure initially (initial seal strength) and after being subjected to humid and warm conditions (humid seal strength).

Typically a coated OPP film can have a layered structure comprising the following layers: top coat; primer; OPP; primer; topcoat.

In particular the aqueous polyurethane composition of the present invention is suitable for use as a primer for plastic substrates, more specifically as a primer for polyethylene and (oriented) polypropylene substrates. The aqueous polyurethane composition of the present invention is particularly suitable as a primer for (oriented) polypropylene substrates, which are subsequently over-coated with a polymer dispersion. Suitable polymer dispersions for over-coating are vinyl polymers including (meth)acrylate polymers and vinyl polymers of which the vinyl monomer vinylidene chloride is a principal component (comprising more than 50 wt %, more preferably more than 88 wt % of vinylidene chloride). An advantage of including vinylidene chloride is that resultant over-coats may be heat-sealable.

Typically, the plastic substrates are pre-treated so that the polarity of the surface is increased. Techniques known in the art to increase the polarity of the surface include flame treatment, Corona treatment and treatment with chromic acid (or salts thereof).

The aqueous polyurethane compositions of the present invention are also suitable for use as label coatings, where the label is coated with the aqueous polyurethane composition for adhesion of the label to a substrate. The substrate may be a plastic substrate as described above. Alternatively, the aqueous polyurethane compositions of the present invention are suitable for use as primer coatings for film labels.

In an embodiment of the present invention there is provided a substrate having a coating comprising an aqueous polyurethane composition according to the present invention and a method for coating a substrate with an aqueous polyurethane composition according to the present invention comprising the application of the aqueous polyurethane composition to the substrate and removal of the aqueous medium.

In an embodiment of the present invention there is provided a primer, preferably for coating plastic substrates, comprising an aqueous polyurethane composition according to the present invention.

There is further provided according to the present invention a label coating obtained from an aqueous polyurethane composition according to the present invention.

The present invention is now illustrated by reference to the following example. Unless otherwise specified, all parts, percentages and ratios are on a weight basis.

Exemplification
Abbreviations used:

| | |
|---|---|
| SA = | stoichiometric amount. |
| DMPA = | dimethylol propanoic acid. |
| pTHF-1000 = | polytetrahydrofuran, Mw 1000. |
| IPDI = | isophorone diisocyanate. |
| TDI = | 2,4-toluene diisocyanate. |
| DES W = | methylene-dicyclohexylene diisocyanate = 4,4'dicyclohexylmethane diisocyanate |
| PPG-1000 = | polypropylene glycol, Mw 1000. |
| EDA = | ethylene diamine. |
| NMP = | N-methyl pyrrolidinone. |
| MMA = | methyl methacrylate |
| BMA = | butyl methacrylate |
| BOPP = | biaxially oriented polypropylene |
| PVDC = | polyvinylidene chloride |
| Diofan A-050 = | anionic polyvinylidene chloride available from Solvin |
| TEA = | triethylamine |
| $NH_3$ = | ammonia used as a 25% aqueous solution |
| $N_2H_4$ = | hydrazine used as a 15.2% aqueous solution |
| NeoCryl BT-36 = | acrylic emulsion available from DSM NeoResins BV |
| Water = | demineralised water |
| Dynomin UM-15 = | Cymel UM-15 = Methylated urea-formaldehyde resin from Cytec. |
| NeoCryl XK-90 = | sequential acrylic emulsion available from DSM NeoResins BV which has a Mw of 2,000,000. |
| ML-160 = | Michem Lübe ML-160 f.e.anionic carnauba wax emulsion available from Michelmann |
| FP-348 = | Formapol FP-348, synthetic amorphous silica dispersion in water available from Formulated Polymer Products. |
| Jeffamine = | amine group terminated polyalkylene oxide, Mw 1,000, available from Huntsman. |

EXAMPLE 1

Step 1: A reactor was charged with pTHF-1000 (1520.4 g; OH number=110 mgKOH/g; pre-melted at 50° C.) and DMPA (168.0 g). The mixture was homogenised to a fine suspension and then IPDI (1111.7 g) was added. The reactor was purged with nitrogen and the contents heated to 50° C. At 50° C., a catalytic amount of tin octoate (0.25 g) was added. The resulting exotherm and additional external heating was used to bring the mixture to a reaction temperature of 90° C. The course of the reaction was monitored by determination of the amount of residual isocyanate groups, by back-titration of the excess of dibutyl amine added to a solution of a sample of the prepolymer in toluene. The reaction temperature was maintained until the NCO content of the resultant polyurethane prepolymer had dropped to a value below the theoretical value of 6.7% NCO, then cooled to 75° C.

Step 2: A second reactor was charged with water (1629.5 g), ammonia (neutraliser, 26.1 g, 25% aqueous solution; 1.0 SA relative to the DMPA acid groups of the polyurethane prepolymer) and hydrazine (extender, 129.9 g, 15.2% aqueous solution; 0.95 SA relative to the residual isocyanate groups of the polyurethane prepolymer) and the temperature of the resultant water phase was set at 30° C.

Step 3: Using a heated 1-L dropping funnel the polyurethane prepolymer (850.0 g) prepared in Step 1 was added over a period of 1 hour to the water phase prepared in Step 2, while keeping the polyurethane prepolymer temperature at 75° C. The temperature of the water phase was allowed to rise to 39° C. during this dispersion step. In Step 3, the neutralisation, the chain extension and the dispersion in water was performed simultaneously.

The resulting translucent polyurethane dispersion had a solids content of 33.0%, a pH of 7.6 and a Brookfield viscosity of 50 mPa·s at room temperature (23+/−2° C.). The concentration of free hydrazine, as determined by HPLC, was around 1 ppm, which is the detection limit of the equipment used.

The relative amounts of the components used for all of the examples are given in Table 1 below.

EXAMPLE 2

A polyurethane dispersion was prepared according to the method of Example 1 except that the chain extension was performed with 0.35 SA EDA, followed by 0.60 SA hydrazine.

EXAMPLE 3

A polyurethane dispersion was prepared according to the method of Example 1 except that the prepolymer was prepared from PPG-1000, DMPA and DES W, in an NCO/OH ratio of 1.5, with 5% of NMP as the cosolvent, neutralisation with 1.3 SA ammonia and chain extension with 0.98 SA hydrazine.

EXAMPLE 4

A polyurethane dispersion was prepared according to the method of Example 3 except that the prepolymer was neutralised with 1.3 SA ammonia in the water phase before dispersion and 1.7 SA was added after dispersion in the water to increase the pH.

EXAMPLE 5

A polyurethane dispersion was prepared according to the method of Example 1 except that the prepolymer was prepared from a polyester polyol with an OH-value of 110 mg KOH/g [prepared from a fatty acid dimer Pripol 1009 (99.4 parts, obtainable from Uniqema), adipic acid (24.8 parts) and cyclohexane dimethanol (75.8 parts)], DMPA, IPDI and Jeffamine [the 1/1 molar adduct of Jeffamine M1000 and hydroxyethyl acrylate, which was prepared separately by mixing both ingredients and heating to 70° C. for 2 hours as described in EP 317258 B1], in an NCO/OH ratio of 1.5, followed by simultaneous dispersion in water, neutralisation with 1.1 SA ammonia and chain extension with 0.95 SA hydrazine.

EXAMPLE 6

A polyurethane dispersion was prepared according to the method of Example 1 except that the prepolymer was prepared from pTHF-1000, DMPA and TDI in an NCO/OH ratio of 1.5 at 80% solids in a 4/1 mixture of BMA and MMA monomers, followed by simultaneous dispersion in water, neutralisation with 1.3 SA ammonia, and chain extension with 0.98 SA hydrazine. Finally, the monomers were converted to an acrylic polymer using Fe. EDTA (2.0 g, 1% in water) and the redox initiation couple t-butyl-hydroperoxide (0.7 g, 70% in water), iso-ascorbic acid (4×10.2 g, 1% in water) (both 0.1% on monomers). The BMA/MMA polymer had a Tg of 34° C. as calculated with the Fox equation. The polyurethane to vinyl polymer ratio was 80:20.

EXAMPLE 7

Blend of the polyurethane dispersion from Example 1 (527.1 g) with a formaldehyde urea resin Dynomin UM-15 (2.6 g).

EXAMPLE 8

Blend of the polyurethane dispersion from Example 1 (527.1 g) with a sequential acrylic emulsion polymer (165.7 g) (NeoCryl XK-90, available from DSM NeoResins BV with two Tg values (calculated with the Fox equation, 0° C. and 80° C.).

COMPARATIVE EXAMPLE C1

A polyurethane dispersion was prepared according to the method of Example 1 except that the neutralisation of the prepolymer was performed with TEA (1.0 SA) instead of ammonia, and the polyurethane dispersion (500 g) was blended with a formaldehyde urea resin Dynomin UM-15 (5.1 g).

COMPARATIVE EXAMPLE C2

A polyurethane dispersion was prepared according to the method of Example 1 except that the chain extension was performed with EDA (0.95 SA) instead of hydrazine.

COMPARATIVE EXAMPLE C3

A polyurethane dispersion was prepared according to the method of Example 1 except that the chain extension was performed with a stoichiometric excess of hydrazine (1.20 SA) instead of a sub-stoichiometric amount. The amount of free hydrazine found in this dispersion (>200 ppm) made it toxicologically irresponsible to test this dispersion as a primer.

The particle sizes of Examples 1 to 8 were less than 200 nm. The polyurethanes prepared in the Examples had an Mn less than 40,000 g/mol. The Example details are given in Table 1 below.

TABLE 1

| | Example | | | | |
|---|---|---|---|---|---|
| | 1 | 2 | 3 | 4 | 5 |
| | Polyurethane Prepolymer | | | | |
| DMPA % | 6.0 | 6.0 | 5.5 | 5.5 | 5.2 |
| Polyol 1 | pTHF1000 | pTHF1000 | PPG1000 | PPG1000 | Polyester |

TABLE 1-continued

|  | | | | | |
|---|---|---|---|---|---|
| % polyol 1 | 54.3 | 54.3 | 56.5 | 56.5 | 52.6 |
| Polyol 2 | — | — | — | — | Jeffamine |
| % polyol 2 | — | — | — | — | 5.0 |
| Diisocyanate | IPDI | IPDI | DES W | DES W | IPDI |
| Diisocyanate % | 39.7 | 39.7 | 38.0 | 38.0 | 37.2 |
| Cosolvent % | — | — | NMP (12.0) | NMP (12.0) | NMP (10.0) |
| Tin octoate % | 0.01 | 0.01 | 0.01 | 0.01 | 0.01 |
| Additives % | — | — | — | — | — |
| NCO/OH | 1.80 | 1.80 | 1.50 | 1.50 | 1.80 |
| NCO % | 6.42 | 6.42 | 3.01 | 3.01 | 5.34 |
| Dispersion | | | | | |
| Prepolymer g | 850.0 | 320.0 | 500.0 | 500.0 | 611.1 |
| Neutraliser g | $NH_3$ (26.1) | $NH_3$ (9.8) | $NH_3$ (16.9) | $NH_3$ (38.9) | $NH_3$ (14.5) |
| SA neutraliser | 1.0 | 1.0 | 1.3 | 3.0 (1.3/1.7) | 1.1 |
| Extension agent | $N_2H_4$ | EDA/$N_2H_4$ | $N_2H_4$ | $N_2H_4$ | $N_2H_4$ |
| Extension agent g | 129.9 | 4.9/33.5 | 37.0 | 37.0 | 79.0 |
| SA extension | 0.95 | 0.30/0.65 | 0.98 | 0.98 | 0.95 |
| Water g | 1629.5 | 614.8 | 931.6 | 931.6 | 1100.0 |
| Properties | | | | | |
| Solids % | 33.0 | 32.5 | 30.5 | 30.1 | 30.3 |
| Viscosity * | 50 | 30 | 184 | 120 | 51 |
| pH | 7.6 | 8.0 | 8.5 | 9.9 | 7.7 |
| Acid value # | 25 | 25 | 23 | 23 | 22 |
| $N_2H_4$ ppm | 1 | 1 | BDL | BDL | BDL |

| | Example | | | |
|---|---|---|---|---|
| | 6 | C1 | C2 | C3 |
| Polyurethane Prepolymer | | | | |
| DMPA % | 9.0 | 5.2 | 6.0 | 6.0 |
| Polyol | pTHF1000 | pTHF1000 | pTHF1000 | pTHF1000 |
| % polyol | 58.2 | 56.6 | 54.3 | 54.3 |
| Diisocyanate % | TDI (37.2) | IPDI (38.2) | IPDI (39.7) | IPDI (39.7) |
| Co-solvent % | BMA/MMA (20) | — | — | — |
| Tin octoate % | — | 0.01 | 0.01 | 0.01 |
| Additives g | Ionol CP (0.2) | — | — | — |
| NCO/OH | 1.50 | 1.80 | 1.80 | 1.80 |
| NCO % | 4.12 | 6.41 | 6.42 | 6.42 |
| Dispersion | | | | |
| Prepolymer g | 500.0 | 500.0 | 320.0 | 320.0 |
| Neutraliser g | $NH_3$ (25.1) | TEA (19.8) | $NH_3$ (9.8) | $NH_3$ (9.8) |
| SA neutraliser | 1.3 | 1.0 | 1.0 | 1.0 |
| Extension agent g | $N_2H_4$ (50.6) | $N_2H_4$ (70.3) | EDA (16.0) | $N_2H_4$ (61.8) |
| SA extension | 0.98 | 0.95 | 0.98 | 1.20 |
| Water g | 693.6 | 1190.8 | 667.5 | 606.5 |
| Properties | | | | |
| Solids % | 38.5 | 27.7 | 32.5 | 32.5 |
| Viscosity * | 72 | 40 | 40 | 40 |
| pH | 6.9 | 8.1 | 9.9 | 8.2 |
| Acid value # | 30 | 22 | 25 | 25 |
| $N_2H_4$ ppm | BDL | 5 | BDL | 205 |

\* mPa · s
\# mg KOH/g
BDL—below the detection limit of the equipment used

The polyurethane and polyurethane/acrylic dispersions described in the Examples 1 to 8 were tested as a primer on corona-treated BOPP foil with a PVDC heat-sealable topcoat (Diofan A-050) and were named Examples 1 (a) to 8 (a).

In Example 1 (b), the polyurethane dispersion from Example 1 was tested as a primer on corona-treated BOPP foil with an acrylic heat-sealable topcoat (NeoCryl BT-36).

In Example 3 (b), the polyurethane dispersion from Example 3 was used as a primer on corona-treated BOPP foil with an acrylic heat-sealable topcoat (NeoCryl BT-36).

In Example 6 (b), the polyurethane dispersion from Example 6 was used as a primer on corona-treated BOPP foil with an acrylic heat-sealable topcoat (NeoCryl BT-36).

The polyurethane dispersion from Comparative Examples C1 and C2 were tested as a primer on corona-treated BOPP foil with a PVDC heat-sealable topcoat (Diofan A-050).

Priming and Coating Experiments Concerned with Heat-Sealable Packaging Applications On a pilot film coater (RK coater from RK Print-Coat Instruments), a water-based primer comprising each one of the polyurethane dispersions prepared in examples 1 to 8 and comparative examples C1 and C2 diluted with demineralised water to a solids content of 5%, was applied by a reverse gravure coating system onto a Corona treated OPP base film (23DR-360 from Derprosa; the surface tension of the base film after Corona treatment was 40-42 dynes/cm) and dried at 80° C. by hot air to give a primed plastic substrate with a 0.15 g/m² dry coat weight.

Then the primed plastic substrate was top-coated by reverse gravure coating with a water-based anionic PVDC dispersion (a) or with a water based acrylic emulsion (b) formulated as described in Table 2 below and dried with hot air at 90° C. The dry coat weight of the PVdC top-coat was 1.5 g/m², whereas the dry coat weight of the acrylic top coat was 1 g/m².

TABLE 2

|  | Diofan A-050 | NeoCryl BT-36 | ML-160 | FP-348 | Water |
|---|---|---|---|---|---|
| PVDC | 83.7 | — | 3.7 | 0.9 | 11.7 |
| Acrylic | — | 70.6 | 3.4 | 0.2 | 25.8 |

The coated films were conditioned for 1 week at room temperature (23+/−2° C.) in order to allow complete crystallization of the PVDC topcoat.

Humid Seal Strength

The coated films prepared above were folded in half (top coat to top coat) and heat-sealed on a Brugger heat-sealer (type HSG-C), equipped with a heated flat metal upper jaw (2 cm width) and an unheated flat rubber bottom jaw. The sealing was performed for 1 second under 2.8 kg/cm² (=40 psi) pressure at 130° C.

Initial heat seal strength (g/inch) was been measured on an Instron Tensile tester.

The sealed film was stored in a humidity cabinet (38° C.; 90% relative air humidity for 4 weeks. The remaining seal strength, measured after 1 day, 1 week, 2 weeks, 3 weeks and 4 weeks, should remain at a similar level.

The initial adhesion and adhesion upon storage of the sealed foils under warm and humid conditions (38° C., 90% relative air humidity is given below in Table 3 in g/inch and g/cm.

TABLE 3

| | Example | | | | | | |
|---|---|---|---|---|---|---|---|
| | 1 (a) | 1 (b) | 2 (a) | 3 (a) | 3 (b) | 4 (a) | 5 (a) |
| | | | | Topcoat | | | |
| | PVDC | Acrylic | PVDC | PVDC | Acrylic | PVDC | PVDC |
| | Adhesion (humid seal strength) g/inch (g/cm) | | | | | | |
| Initial | 489 (193) | 638 (251) | 725 (285) | 778 (306) | 565 (222) | 724 (285) | 298 (117) |
| 1 day | 357 (141) | 524 (206) | 356 (140) | 487 (192) | 524 (206) | 387 (152) | 449 (177) |
| 1 week | 476 (187) | 621 (244) | 416 (164) | 562 (221) | 621 (244) | 535 (211) | 580 (228) |
| 2 weeks | 517 (205) | 595 (234) | 407 (160) | 601 (237) | 636 (250) | 564 (220) | 631 (248) |
| 3 weeks | 431 (170) | 637 (251) | 353 (139) | 616 (243) | 692 (272) | 618 (243) | 672 (265) |
| 4 weeks | 419 (165) | 634 (250) | 300 (118) | 603 (237) | 621 (244) | 584 (230) | 628 (247) |

| | Example | | | | | |
|---|---|---|---|---|---|---|
| | 6 (a) | 6(b) | 7 (a) | 8 (a) | C1 (a) | C2 (a) |
| | | | topcoat | | | |
| | PVDC | Acrylic | PVDC | PVDC | PVDC | PVDC |
| | Adhesion (humid seal strength) g/inch (g/cm) | | | | | |
| Initial | 756 (298) | 412 (162) | 275 (108) | 417 (164) | 84 (33) | 115 (45) |
| 1 day | 472 (186) | 287 (113) | 268 (106) | 273 (107) | 46 (18) | 60 (24) |
| 1 week | 634 (250) | 206 (81) | 272 (107) | 258 (102) | 44 (17) | 62 (24) |
| 2 weeks | 669 (263) | 240 (94) | 419 (165) | 309 (122) | 46 (18) | 40 (16) |
| 3 weeks | 577 (227) | 266 (105) | 373 (147) | 214 (84) | 112 (44) | 40 (16) |
| 4 weeks | 624 (246) | 237 (93) | 439 (173) | 302 (119) | 78 (31) | 40 (16) |

The invention claimed is:

1. An aqueous polyurethane composition comprising a polyurethane having an acid value in the range of from 4 to 150 mgKOH/g and which comprises the reaction product of:

(A) an isocyanate-terminated prepolymer comprising a terminal isocyanate group, the prepolymer (A) being obtained by the reaction of components comprising:

(i) at least one organic polyisocyanate compound comprising isocyanate groups;

(ii) at least one isocyanate-reactive compound comprising an isocyanate reactive group, the compound (ii) bearing anionic or potentially anionic water-dispersing groups;

(iii) at least one isocyanate-reactive compound comprising an isocyanate reactive group, the compound (iii) not comprising compound (ii); wherein the isocyanate terminated prepolymer components are reacted in a ratio of the isocyanate groups of compound (i) to the isocyanate-reactive groups of compounds (ii) and (iii) in the range of from 1.1:1 to 6:1; and (B) at least one isocyanate reactive active-hydrogen chain-extending compound comprising an isocyanate reactive active-hydrogen group, where the compound (B) comprises at least 0.20 stoichiometric equivalents with respect to the isocyanate content of the isocyanate-terminated prepolymer (A), of an isocyanate reactive active-hydrogen chain-extending compound selected from the group consisting of hydrazine, hydrazine derivatives and mixtures thereof;

Wherein the prepolymer (A) and the compound (B) are reacted in a ratio of the isocyanate groups of the prepolymer (A) to the isocyanate reactive active-hydrogen groups of the compound (B) in the range of from 1:0.5 to 1:1; and wherein at least 0.2 stoichiometric equivalents of the anionic or potentially anionic water-dispersing groups are neutralised with ammonia.

2. An aqueous polyurethane composition according to claim 1 having a free hydrazine content ≦20 ppm.

3. An aqueous polyurethane composition according to claim 1 wherein the polyurethane has an acid value in the range of from 4 to 100 mgKOH/g.

4. An aqueous polyurethane composition according to claim 1 wherein the active-hydrogen containing chain-extender (B) comprises at least 0.4 stoichiometric equivalents with respect to the isocyanate content of the isocyanate-terminated prepolymer (A) of an active-hydrogen chain-extending compound selected from the group consisting of hydrazine, hydrazine derivatives and mixtures thereof.

5. An aqueous polyurethane composition according to claim 1 wherein the ratio of isocyanate groups in the isocyanate-terminated prepolymer (A) to active-hydrogens in the chain-extender (B) is in the range of from 1:0.6 to 1:1.

6. An aqueous polyurethane composition according to claim 1 wherein at least 0.25 stoichiometric equivalents of the anionic or potentially anionic water-dispersing groups are neutralised with ammonia.

7. An aqueous polyurethane composition according to claim 1 comprising a polyurethane having an acid value in the range of from 10 to 42 mgKOH/g and which comprises the reaction product of:
  (A) an isocyanate-terminated prepolymer comprising a terminal isocyanate group, the prepolymer (A) being obtained by the reaction of components comprising:
    (i) 10 to 90 wt % at least one organic polyisocyanate compound comprising isocyanate groups;
    (ii) 0.1 to 80 wt % of at least one isocyanate-reactive compound comprising an isocyanate-reactive group, the compound (ii) bearing anionic or potentially anionic water-dispersing groups;
    (iii) 5 to 90 wt % of at least one isocyanate-reactive compound comprising an isocyanate-reactive group, the compound (iii) not comprising compound (II);
    where (i)+(ii)+(iii)=100%;
    wherein the isocyanate terminated prepolymer components are reacted in a ratio of the isocyanate groups of compound (i) to the isocyanate-reactive groups of compounds (ii) and (iii) in the range of from 1.1:1 to 6:1; and
  (B) at least one isocyanate reactive active-hydrogen chain-extending compound comprising an isocyanate reactive active-hydrogen group, where the compound (B) comprises at least 0.4 stoichiometric equivalents with respect to the isocyanate content of the isocyanate-terminated prepolymer (A), of an isocyanate reactive active-hydrogen chain-extending compound selected from the group consisting of hydrazine, hydrazine derivatives and mixtures thereof;
  wherein the prepolymer (A) and the compound (B) are reacted in a ratio of the isocyanate groups of prepolymer (A) to the isocyanate-reactive active-hydrogen groups of compound (B) in the range of from 1:0.8 to 1:0.99; and
  wherein in the range of from 0.25 and 3 stoichiometric equivalents of the anionic or potentially anionic water-dispersing groups are neutralised with ammonia.

8. An aqueous polyurethane composition according to claim 7 wherein component (i) is selected from the group consisting of isophorone diisocyanate, 4,4'-dicyclohexylmethane diisocyanate, 2,4-toluene diisocyanate and mixtures thereof.

9. An aqueous polyurethane composition according to claim 7 wherein component (ii) is selected from the group consisting of 2,2-dimethylol propionic acid (DMPA), 2,2-dimethylolbutanoic acid (DMBA) and mixtures thereof.

10. An aqueous polyurethane composition according to claim 7 wherein component (iii) is selected from the group consisting of polytetrahydrofuran; polypropylene glycol; polyester; amine group terminated polyalkylene oxides or derivatives; and mixtures thereof.

11. An aqueous polyurethane composition according to claim 10 wherein component (iii) has a Mw in the range of from 300 to 3000 g/mol.

12. An aqueous polyurethane composition according to claim 10 wherein component (iii) comprises <15 wt % of organic compounds having a Mw below 500 g/mol.

13. An aqueous polyurethane composition according to claim 1, additionally comprising a vinyl polymer wherein the weight ratio of polyurethane to vinyl polymer is in the range of from 10:90 to 99:1.

14. An aqueous polyurethane composition according to claim 13 wherein the vinyl polymer is a (meth)acrylate polymer.

15. An aqueous polyurethane composition according to claim 13 where the vinyl polymer has a Tg in the range of from −80 to 150° C.

16. An aqueous polyurethane composition according to claim 13 wherein the acid value of the vinyl polymer is in the range of from 0 to 100 mgKOH/g.

17. An aqueous polyurethane composition according to claim 13 comprising a separately prepared vinyl polymer with a polyurethane to vinyl solids ratio in the range of from 60:40 to 80:20; wherein the vinyl polymer has a Tg in the range of from 0 to 50° C. and is prepared from vinyl monomers selected from the group comprising of methyl methacrylate, ethyl (meth)acrylate, butyl (meth)acrylate, styrene, (meth)acrylic acid and mixtures thereof.

18. A process for preparing the aqueous composition according to claim 1 comprising the following steps:
  a) reaction of components (i) to (iii) to form an isocyanate-terminated prepolymer (A);
  b) forming an aqueous dispersion of the isocyanate-terminated prepolymer (A);
  c) neutralising the isocyanate-terminated prepolymer (A);
  d) chain-extension of the isocyanate-terminated prepolymer (A) by reaction with the active-hydrogen chain-extending compound (B).

19. A process according to claim 18 additionally comprising steps:
  e) the addition of a reactive diluent; and f) the subsequent polymerisation of the reactive diluent.

20. A coated substrate comprising a substrate and a coating on the substrate comprised of the aqueous polyurethane composition according to claim 1.

21. A method for coating a substrate with an aqueous polyurethane composition comprising applying the aqueous polyurethane composition according to claim 1 to a substrate and removing the aqueous medium.

22. A primer comprising an aqueous polyurethane composition according to claim 1.

23. A label coating composition comprising the aqueous polyurethane composition according to claim 1.

24. A heat-sealable coating composition comprising the aqueous polyurethane composition according to claim 1 which when heat sealed has a heat seal strength $\geq 200$ g/inch (78.74 g/cm).

25. A coated label comprising a label and a coating on the label which comprises the aqueous polyurethane composition according to claim 1.

26. A heat-sealed coated substrate comprising a substrate and a heat-sealed coating on the substrate, wherein the heat sealed coating comprises a dried residue of the aqueous polyurethane composition according to claim 1 having a heat seal strength of $\geq 200$ g/inch (78.74 g/cm).

* * * * *